April 9, 1963 V. L. HILL 3,085,125
THERMOCOUPLE
Filed Oct. 2, 1961 2 Sheets-Sheet 1

INVENTOR.
Vernon L. Hill
BY
R. J. Wallace
ATTORNEY

United States Patent Office 3,085,125
Patented Apr. 9, 1963

3,085,125
THERMOCOUPLE
Vernon L. Hill, Indianapolis, Ind., assignor to General Motors Corporation, Detroit, Mich., a corporation of Delaware
Filed Oct. 2, 1961, Ser. No. 142,100
12 Claims. (Cl. 136—4)

This invention relates to thermocouples of the type having a bimetal joint, the E.M.F. of which is a function of temperature. Thermocouples of this type are used for the measurement and indication of relatively high temperatures, such as present in gas turbine engines and the like. The invention is especially advantageous in the formation of thermocouples wherein a bimetal joint is formed by two dissimilar metal wires which are exposed to a high temperature corrosive and erosive atmosphere.

It is frequently advantageous and, in some instances mandatory, that a thermocouple be adapted to provide a very small time lag between the time the temperature of an environment changes and the time the thermocouple registers, or indicates, such a change. This is particularly true for thermocouples used in aircraft jet engines, since it is obviously necessary that the pilot of the aircraft be immediately aware of any change in engine temperature. In order to minimize the time lag, it is important that the temperature sensitive bimetal junction of the thermocouple be directly exposed to the hot gases within the gas turbine engine rather than enclosed by a protective shield or casing. Such exposure, however, presents other difficulties. The rapidly moving gases contacting the bimetal junction are oxidizing in nature and are at a relatively high temperature. In addition, the exposed bimetal junction is subjected to a considerably greater thermal shock than when enclosed in a suitable casing. The combined effect of these actions, among other things, is to reduce the effective cross-sectional area of the thermocouple elements. Thus, the thermocouple not only has a shorter useful life, but it must periodically be recalibrated. Where this degeneration of the thermocouple is fairly rapid, as in a jet engine environment, it is obviously important that the thermocouple be frequently recalibrated.

It is an object of this invention to provide a bimetal junction which has greater resistance to corrosion and erosion and has greater thermal shock resistance than heretofore available and to provide a method of forming such a thermocouple.

Other objects, features and advantages of the invention will become more apparent from the following description of preferred examples thereof and from the drawings, in which.

Figure 3:
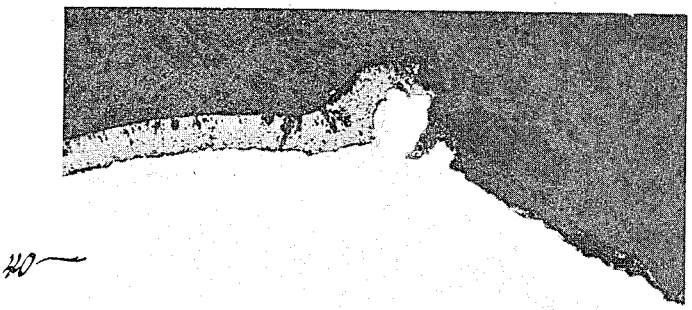
Figure 3:
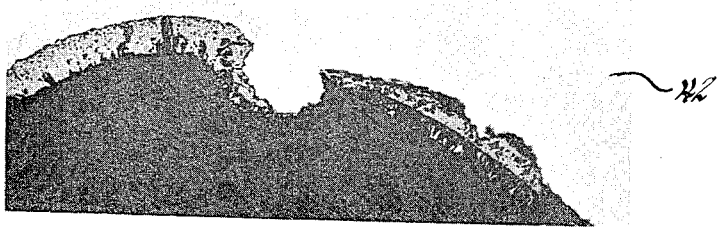
Figure 4:
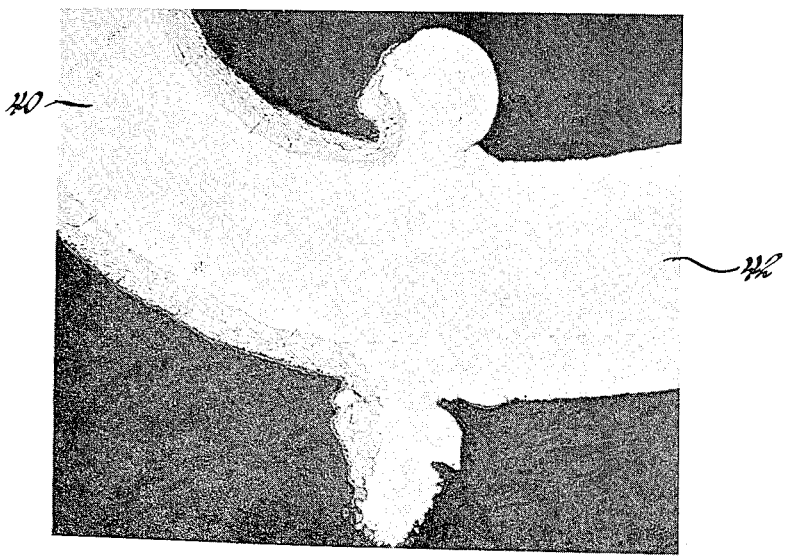

FIGURE 3 shows a photomicrograph of a longitudinal sectional view through a bimetal junction of two dissimilar nickel base alloy elements which have been conventionally formed and which have been subjected to prolonged exposure to a high temperature oxidizing environment; and FIGURE 4 shows a photomicrograph of a longitudinal sectional view through a bimetal junction of the same metals shown in FIGURE 3, the junction being formed in accordance with the invention and also subjected to the same exposure as the FIGURE 3 junction.

The invention comprehends diffusing boron into the surface of the thermocouple elements to increase the abrasion resistance, corrosion resistance and thermal shock resistance of the bimetal junction. More specifically, the invention comprehends providing a thermocouple formed of two boronized dissimilar nickel base alloy elements, one of the alloys containing about 95% nickel and 2% aluminum and the other containing about 90% nickel and about 9% chromium.

Figures 1, 2:
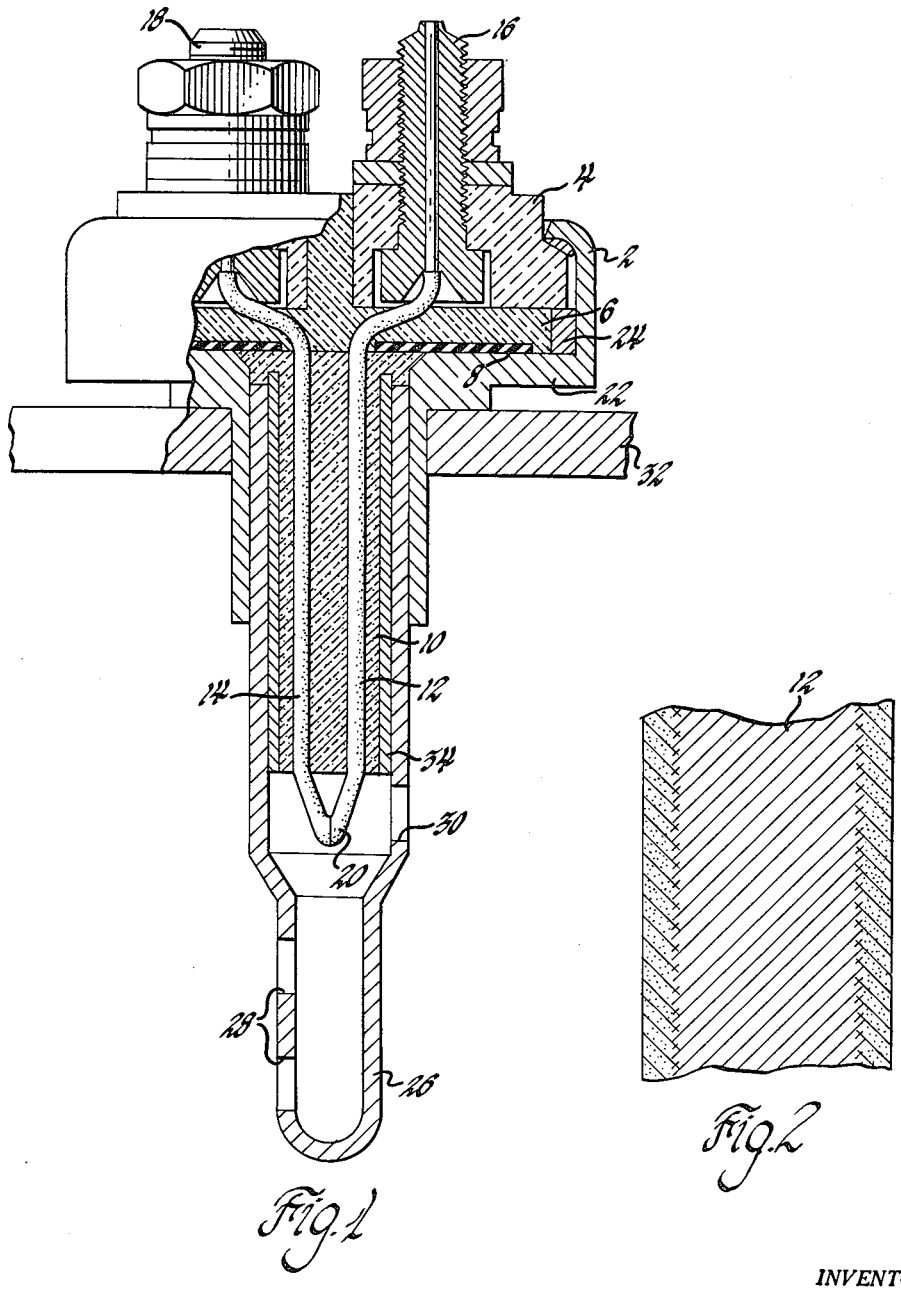
FIGURE 1 shows, in partial section, a thermocouple assembly having exposed thermocouple elements.
FIGURE 2 shows an enlarged sectional view of a portion of one of the thermocouple elements shown in FIGURE 1.

Referring now to FIGURE 1, the thermocouple shown comprises a metal housing 2 having secured therein electrical insulator bodies 4, 6, 8 and 10 which serve to support and insulate a pair of thermocouple wires, shown at 12 and 14. Insulator 4 is preferably a high heat and thermal shock-resistant ceramic block of high alumina composition, insulator 6 a hardened ceramic cement, insulator 8 a mica disc, and insulator 10 a tightly packed ceramic powder, such as magnesium oxide. The upper ends of the wires are secured to electrical terminals 16 and 18 and the lower ends extend to the exterior of packed insulator member 10, where they are welded together to form the heat sensitive junction 20. Frequently two pairs of wires are used to form two heat sensitive junctions, thereby producing two parallel thermocouple circuits. The metal housing 2 is cylindrical in shape having an upper portion of larger diameter and a lower portion of smaller diameter which are joined by a connecting wall 22. Positioned within the housing between the wall 22 and insulator 4 is a bronze ring 24 to compensate for differences in coefficients of expansion and provide a continuously tight fit between the parts. A tubular metal member 26 is brazed within and forms an extension to the lower tubular portion of the metal housing 2 and is provided with a plurality of gas inlet openings 28 and at least one outlet opening 30 to allow the hot gases to pass in contact with the heat sensitive junction 20. The chief purpose for this member 26 is to route samples of gas from various levels to the heat sensitive junction, this by way of the plurality of gas inlet openings. A suitable support flange 32 is provided in order that the thermocouple may be secured in its operating position and location such, for example, as in the combustion chamber wall of an aircraft gas turbine engine.

Each of the terminals 16 and 18 is provided with a through-bore through which one of the thermocouple wires extends, the top of the thermocouple wire being welded to the top of the screw thereby assuring good electrical contact. The thermocouple wires are bent inwardly from the terminals and then downwardly extending through the packed insulator member 10 and joined, as by welding externally thereof, to form the heat sensitive junction 20.

As previously indicated the present invention is particularly directed to the formation of an improved bimetal junction. As shown in FIGURE 2, the surface of each of the two wires 12 and 14 is impregnated with boron to form a protective surface zone thereon. While it is of utmost importance that the entirety of the exposed portion of the thermocouple wires be boronized, the balance of the wires can be left uncoated or can be coated, as is desired.

Especially satisfactory results have been obtained with a boronized thermocouple having one junction element formed of a nickel base alloy containing about 0.1% silicon, 0.08% carbon, 0.8% manganese, 0.3% iron, 9.3% chromium, with the balance being substantially nickel, and the other junction element formed of a nickel base alloy containing about 1% silicon, 0.8% carbon, 2% manganese, 2% aluminum, 0.3% iron, with the balance being substantially nickel. It is to be understood that the compositions of these alloys are preferred compositions and can be varied to some extent without fundamentally altering the basic and fundamental properties thereof.

Although the invention has been found to provide exceptionally satisfactory results with thermocouple elements formed of the nickel base alloys referred to, generally similar characteristics can be imparted to thermocouples formed of other materials, including ferrous base alloys, tungsten base alloys, rhenium base alloys and constantan. Unless otherwise indicated, the term "alloy" is used herein to include all metals containing more than 50% of the named pure elemental metal, thus including the pure elemental metal itself.

While the thermocouple wires can be boronized prior to the time the bimetal junction is formed, best results have been obtained by first forming the bimetal junction and then boronizing the joined thermocouple wires. The boronizing can be accomplished by electrolysis in molten sodium tetraborate or by boronizing in the gas phase using a $BCl_3$-$H_2$ mixture. Any of the other known applicable methods of boronizing can also be used. However, extremely satisfactory results have been obtained when boronizing thermocouple wires by immersion in a molten sodium tetraborate bath containing about 5% to 20%, by weight, boron carbide, the bath being maintained at a temperature of about 1500° F. to 2150° F. In some instances it may be preferred to obtain a deeper boron penetration and a more ductile surface coating. In such instances the boronized wires can be heated in a protective atmosphere, if desired, to a temperature of approximately 1600° F. to 2100° F. for a suitable time, such as one hour, to diffuse the boron deeper into the surface of the part. For 18 gauge thermocouple wires approximately 0.04 inch in diameter boronizing in a molten borax bath containing 15% boron carbide for approximately 30 minutes at about 1700° F. is generally satisfactory.

The preferred depth of boron impregnation which is desired is variable and primarily depends upon the desired characteristics of the bimetal junction. For a jet engine thermocouple formed of 18 gauge wire, using the nickel base alloys previously described, a surface penetration of about 0.0003 inch is preferred. Correspondingly, in most instances, a surface penetration of at least about 0.0003 inch boron penetration should be used for thermocouple wires of greater diameter to obtain maximum improvement.

The joining of the alloy wires is preferably accomplished before the elements are boronized by fusion welding, without the use of a filler wire. To form the junction configuration shown in FIGURE 1, the wires are preferably held at a small angle with respect to one another with the ends thereof in contact. After welding, the wires are preferably annealed by heating at about 1800° F. for approximately 30 minutes. The annealing and boronizing can be concurrently accomplished, if desired. While fusion welding provides the most satisfactory results for the bimetal junction, the junction can be formed by any process which provides intimate contact of the wires without contamination of the junction. Accordingly, fusion welding, percussion welding, ultrasonic welding and the like can be used, and in some instances bimetal junctions have been formed with merely a mechanical connection.

After the boronized junction has completely cooled, the wires are positioned to extend through the metal tube 34, and the powdered insulating material 10 is tightly packed into the tube about the wires, as by tamping, swagging or the like. A suitable jig may be used to support the wires in proper spaced relation to the tube during this tamping operation. The terminals are then secured to the upper ends of the thermocouple wires and the assembly of the other parts completed.

FIGURES 3 and 4 illustrate a comparative improvement in thermal shock resistance obtainable by the present invention. In FIGURE 3 a photomicrograph shows a thermocouple junction of a wire 40 and a wire 42. The wire 40 is formed of a nickel base alloy containing 2% aluminum and about 95% nickel. The wire 42 is formed of a nickel base alloy containing about 9% chromium and 90% nickel. The thermocouple shown in the photomicrograph of FIGURE 4 is of the same materials as indicated. The thermocouple junction shown in FIGURE 3 was not boronized while that shown in FIGURE 4 was boronized by immersion in the boron carbide-sodium tetraborate in the manner previously described. Both junctions were subjected to 1800° F. in a stress rupture furnace for a period of 136 hours. The furnace was open at both ends to permit free access of air. The untreated junction shown in FIGURE 3 exhibited over double the corrosion of the boronized bimetal junction shown in FIGURE 4. Hardness of the boronized surface is about double that of the surface which is not boronized. Moreover, because the boronizing also hardens the surface of these alloys, the thermocouple is considerably more resistant to abrasion.

Although this invention has been described in connection with certain specific examples thereof, no limitation is intended thereby except as defined in the appended claims.

I claim:
1. A thermocouple having a bimetal junction formed by two different metals, each of which is boronized.
2. A thermocouple for exposure to high temperature corrosive and erosive environments comprising a junction of two dissimilar boronized metals, said dissimilar metals being selected from the group consisting of ferrous base alloys, nickel base alloys, tungsten base alloys, rhenium base alloys and constantan.
3. A thermocouple comprising a junction of two boronized dissimilar nickel base alloy elements.
4. A thermocouple for exposure to high temperature corrosive and erosive environments comprising a junction of two dissimilar nickel base alloy wires having a diameter of at least 0.04 inch and having boron diffused into the surface thereof to a depth of at least about 0.0003 inch.
5. A thermocouple comprising a junction of a boronized element formed of a nickel base alloy containing about 2% aluminum and 95% nickel and a boronized element formed of a nickel base alloy containing about 9% chromium and 90% nickel.
6. A theromcouple comprising a junction of a boronized element formed of a nickel base alloy containing about 1% silicon, 0.8% carbon, 2% manganese, 2% aluminum, 0.3% iron with the balance substantially nickel and a boronized element formed of a nickel base alloy containing about 0.1% silicon, 0.08% carbon, 0.8% manganese, 0.3% iron, 9.3% chromium and the balance substantially nickel.
7. A thermocouple assembly comprising a metal tube containing a tightly packed powdered insulating material, a pair of metal wires extending through said insulating material, the upper ends of said wires being electrically connected to terminals and the lower ends of said wires being joined together externally of said insulating material to form a heat sensitive junction, and the surface of at least the exposed portions of said wires external said insulating material being impregnated with boron.
8. A method of making a thermocouple which comprises boronizing two dissimilar metal thermocouple elements and joining the elements to form a heat sensitive junction.
9. The method which comprises boronizing two dissimilar nickel base alloy thermocouple elements and joining said elements to form a heat sensitive junction.
10. The method which comprises maintaining a molten bath containing boron carbide, immersing at least one thermocouple element in said bath to impregnate the surface thereof with boron and contacting said element with a dissimilar metal to form a heat sensitive junction.
11. The method which comprises maintaining a molten sodium tetraborate bath containing boron carbide at a temperature of about 1500° F. to 2150° F., immersing at least one thermocouple element in said bath to impreg- nate the surface thereof with boron and contacting said element with another thermocouple element to form a heat sensitive junction.

12. The method which comprises maintaining a sodium tetraborate bath containing 5% to 20%, by weight, boron carbide at a temperature of about 1500° F. to 2150° F., immersing at least one nickel base alloy thermocouple element in said bath for at least about 30 minutes to impregnate the surface thereof with boron and contacting said element with another thermocouple element to form a heat sensitive junction.

References Cited in the file of this patent
UNITED STATES PATENTS

| | | |
|---|---|---|
| 2,697,734 | Zvanut | Dec. 21, 1954 |
| 2,757,220 | Carter | July 31, 1956 |
| 2,870,233 | Comer | Jan. 20, 1959 |